(12) United States Patent
Chen et al.

(10) Patent No.: US 12,525,613 B2
(45) Date of Patent: Jan. 13, 2026

(54) METHOD FOR MAKING A CARBON MATERIAL FOR ANODE AND LITHIUM-ION RECHARGEABLE BATTERY (71) Applicant: CPC CORPORATION, TAIWAN, Kaohsiung (TW)

(72) Inventors: Yan-Shi Chen, Chiayi (TW); Guo-Hsu Lu, Chiayi (TW)

(73) Assignee: CPC CORPORATION, TAIWAN, Kaohsiung (TW)

( * ) Notice: Subject to any disclaimer, the term of this patent is extended or adjusted under 35 U.S.C. 154(b) by 501 days.

(21) Appl. No.: 18/149,904

(22) Filed: Jan. 4, 2023

(65) Prior Publication Data

US 2024/0154120 A1 May 9, 2024

(30) Foreign Application Priority Data

Nov. 3, 2022 (TW) .................................. 111142065

(51) Int. Cl.
*H01M 4/587* (2010.01)
*C01B 32/05* (2017.01)
*H01M 10/0525* (2010.01)
*H01M 4/02* (2006.01)

(52) U.S. Cl.
CPC ............. *H01M 4/587* (2013.01); *C01B 32/05* (2017.08); *H01M 10/0525* (2013.01); *C01P 2004/61* (2013.01); *C01P 2004/84* (2013.01); *C01P 2006/40* (2013.01); *H01M 2004/027* (2013.01)

(58) Field of Classification Search
CPC .... H01M 4/587; H01M 10/0525; C01B 32/05
USPC ............................................ 429/218.1, 231.8
See application file for complete search history.

(56) References Cited

U.S. PATENT DOCUMENTS

2021/0238039 A1  8/2021  Chen et al.

FOREIGN PATENT DOCUMENTS

TW  I720805 B  3/2021

*Primary Examiner* — Kevin P Kerns
(74) *Attorney, Agent, or Firm* — Osha Bergman Watanabe & Burton LLP (57) ABSTRACT A method for making a carbon material for an anode of a lithium-ion secondary battery includes a sequence of: a) heating a heavy hydrocarbon oil to obtain a green coke, b) heating the green coke to form a carbon-containing material, c) grinding the carbon-containing material into a powder, and collecting a portion of the powder, d) heating the portion of the powder to obtain a carbonaceous powder, and e) adding pitch to the carbonaceous powder and heating the pitch-contained carbonaceous powder. A lithium-ion secondary battery, which includes the anode having the carbon material, is also disclosed.

5 Claims, 7 Drawing Sheets

METHOD FOR MAKING A CARBON MATERIAL FOR ANODE AND LITHIUM-ION RECHARGEABLE BATTERY

CROSS-REFERENCE TO RELATED APPLICATION

This application claims priority to Taiwanese Invention Patent Application No. 111142065, filed on Nov. 3, 2022.

FIELD

The disclosure relates to a method for making a carbon material, and more particularly to a method for making a carbon material for an anode, and a lithium-ion rechargeable battery (i.e., a lithium-ion secondary battery) in which the anode includes the carbon material.

BACKGROUND

Among the various types of rechargeable batteries on the market, lithium-ion rechargeable batteries are the most popular. It is common knowledge that a cathode of a conventional lithium-ion rechargeable battery includes lithium cobalt oxide, lithium iron phosphate or lithium manganese oxide, while an anode of the conventional lithium-ion rechargeable battery includes a carbon material.

In addition, it is common knowledge to technicians working in the oil refining business that in an oil refining process, a large amount of heavy hydrocarbon oil is generated. Oil refineries often sell the heavy hydrocarbon oil at a low price, thus creating low economic value. However, it should be noted that the heavy hydrocarbon oil is mainly made of hydrocarbon, which may be used to make carbon materials for the anode of the lithium-ion rechargeable battery.

The applicant discloses, in Taiwanese Patent Publication No. 1603528, a precursor composition for forming an amorphous carbon-containing material, and further discloses, in Taiwanese Patent Publication No. TW1720805 (i.e., a counterpart application of US Patent Application Publication No. US 2021/0238039 A1), a soft carbon and a method for making the same. In the two abovementioned disclosures, analysis on the application of the amorphous carbon-containing material and the soft carbon in the lithium-ion rechargeable batteries in terms of cycle charge capacity and cycle discharge capacity was conducted. However, for researchers in this field, improving the lithium-ion rechargeable battery's capacity retention rate and cycle life in fast charging and fast discharging is an issue awaiting to be resolved.

SUMMARY

Therefore, an object of the disclosure is to provide a method for making a carbon material for an anode of a lithium-ion rechargeable battery that can alleviate at least one of the drawbacks of the prior art.

According to a first aspect of the disclosure, a method for making a carbon material for an anode of a lithium-ion rechargeable battery includes a sequence of the steps of: a) heating a heavy hydrocarbon oil so as to form the heavy hydrocarbon oil into a green coke; b) heating the green coke at a first heating rate to and keeping at a first temperature for at least 4 hours so as to form the green coke into a carbon-containing material, the first heating rate ranging from 3° C./min to 5° C./min, the first temperature ranging from 850° C. to 900° C.; c) grinding the carbon-containing material into a powder, and sizing the powder to collect a portion of the powder which has a D50 particle size in a range from 8 μm to 12 μm, and a D10 particle size in a range from 1 μm to 8 μm; d) heating the portion of the powder at a second heating rate to and keeping at a second temperature for at least 4 hours so as to form the portion of the powder into a carbonaceous powder, the second heating rate ranging from 3° C./min to 10° C./min, the second temperature ranging from 1030° C. to 1220° C.; and e) adding pitch to the carbonaceous powder to form a pitch-contained carbonaceous powder, and heating the pitch-contained carbonaceous powder at a third heating rate to and keeping at a third temperature for at least 5 hours so as to form the pitch-contained carbonaceous powder into a pitch-modified soft carbon, the third heating rate ranging from 0.90° C./min to 1.25° C./min, the third temperature ranging from 1030° C. to 1220° C.

According to a second aspect of the disclosure, a lithium-ion rechargeable battery includes an outer casing, an anode disposed inside the outer casing and including the carbon material made by the above-mentioned method, a cathode disposed inside the outer casing and spaced apart from the anode, an electrolyte filled inside the outer casing, and a separator disposed inside the outer casing and disposed between the anode and the cathode.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

According to a first embodiment of the present disclosure, a method for making a carbon material for an anode of a lithium-ion rechargeable battery includes a sequence of the following steps of a), b), c), d), and e).

In step a), a hydrocarbon heavy oil is heated so as to form the heavy hydrocarbon oil into a green coke. Specifically, the hydrocarbon heavy oil is poured into a reaction tank (not shown), where the heavy hydrocarbon oil is heated under a coking temperature ranging from 480° C. to 550° C. and under a pressure ranging from 0.2 MPa to 4 MPa for 1 to 16 hours, so that the hydrocarbon heavy oil undergoes pyrolysis and polycondensation reactions, thereby forming the green coke. In Example 1 for the first embodiment, the hydrocarbon heavy oil is heated under the coking temperature of 500° C. and under the pressure of 1.0 MPa for 4 hours.

Step b) is a preliminary carbonization treatment. Specifically, step b) is conducted by heating the green coke at a first heating rate ranging from 3° C./min to 5° C./min to a first temperature ranging from 850° C. to 900° C., and keeping at the first temperature for at least 4 hours so as to form the green coke into a carbon-containing material. During the preliminary carbonization treatment, the green coke undergoes one of a polycondensation reaction, a dehydrogenation reaction, a pyrolysis reaction, and combinations thereof, such that the obtained carbon-containing material includes $sp^2$ hybridization. In Example 1, the green coke is heated at the first heating rate of 5° C./min to the first heating temperature of 900° C., and kept at the first heating temperature for 4 hours.

Step c) is a powdering and sizing process. Specifically, the carbon-containing material is ground into a powder (i.e., a carbon-containing powder), and the powder is sized so that a portion of the powder which has a D50 particle size in a range from 8 μm to 12 μm and a D10 particle size in a range from 1 μm to 8 μm is collected. In Example 1, a classifying cyclone is used to size the powder, and the portion of the powder to be collected has the D50 particle size in a range from 10 μm to 12 μm, the D10 particle size in a range from 6 μm to 8 μm, and a D90 particle size in a range from 18 μm to 20 μm.

Step d) is a main carbonization treatment. Specifically, the portion of the powder is heated at a second heating rate to and is kept at a second temperature for at least 4 hours so as to form the portion of the powder into a carbonaceous powder. The second heating rate ranges from 3° C./min to 10° C./min, and the second temperature ranges from 1030° C. to 1220° C. During the main carbonization treatment, the green coke remained in the portion of the powder further undergoes one of the polycondensation reaction, the dehydrogenation reaction, the pyrolysis reaction, and combinations thereof, such that remained green coke is treated to have $sp^2$ hybridization. In some embodiments, in step d), the second temperature ranges from 1080° C. to 1120° C. In Example 1, the portion of the powder is heated at the second heating rate of 10° C./min to a temperature of 1100° C.

Step e) is a surface modifying carbonization treatment. Specifically, pitch is added to the carbonaceous powder to form a pitch-contained carbonaceous powder, and the pitch-contained carbonaceous powder is heated at a third heating rate to and kept at a third temperature for at least 5 hours so as to form the pitch-contained carbonaceous powder into a pitch-modified soft carbon. The third heating rate ranges from 0.90° C./min to 1.25° C./min, and the third temperature ranges from 1030° C. to 1220° C. It should be noted that micropores may be formed on surfaces of particles in the portion of the powder obtained in step c), which may increase a specific surface area of the carbonaceous powder to be made. An anode of a battery made from the carbonaceous powder that has the increased specific surface area is prone to be wetted by electrolytic solutions, which may impair performance of the battery. Therefore, during the surface-modifying carbonization treatment, by heating the pitch-contained carbonaceous powder to a temperature not lower than a softening point of the pitch, a viscosity of the pitch is reduced and the micropores of the carbonaceous powder may be modified (i.e., covered and coated) by the pitch, so that the specific surface area of the soft carbon thus obtained may effectively be reduced.

In some embodiments, in step e), the pitch includes at least 4 weight parts based on 100 weight parts of the carbonaceous powder. The third heating rate ranges from 1.20° C./min to 1.25° C./min, and the third temperature ranges from 1080° C. to 1120° C. such that the pitch-modified soft carbon becomes a first soft carbon. In Example 1, the pitch-contained carbonaceous powder is heated at the third heating rate of 1.22° C./min to and kept at the third temperature of 1100° C., thereby forming the first soft carbon.

The second embodiment of this disclosure is generally similar to the first embodiment except for a main difference that resides in step c). In the second embodiment, the portion of the powder to be collected has the D50 particle size in a range from 8 μm to 10 μm and the D10 particle size in a range from 2 μm to 6 μm, and after the subsequent completion of step e), a second soft carbon is formed. In Example 2 for the second embodiment for obtaining the second soft carbon, steps a), b), d) and e) are the same as those described in Example 1, and in step c), the portion of the powder to be collected has the D50 particle size in a range from 8 μm to 10 μm, the D10 particle size in a range from 3 μm to 5 μm, and the D90 particle size in a range from 16 μm to 18 μm.

The third embodiment of this disclosure is generally similar to the first embodiment except for a main difference that resides in steps d) and e). In step d) of the third embodiment, the portion of the powder is heated to the second temperature ranging from 1180° C. to 1220° C. In step e) of the third embodiment, the pitch-contained carbonaceous powder is heated at the third heating rate ranging from 0.92° C./min to 0.98° C./min to the third temperature ranging from 1180° C. to 1220° C. so as to form the pitch-modified soft carbon into a third soft carbon. In Example 3 for the third embodiment for obtaining the third soft carbon, steps a) to c) are the same as those described in Example 1, step d) involves the portion of the powder being heated to 1200° C., and step e) involves the pitch-contained carbonaceous powder being heated at the third heating rate of 0.95° C./min to a temperature of 1200° C.

The fourth embodiment of this disclosure is generally similar to the first embodiment except for a main difference that resides steps d) and e). In step d) of the fourth embodiment, the portion of the powder is heated to the second temperature ranging from 1030° C. to 1070° C. In step e) of the fourth embodiment, the pitch-contained carbonaceous powder is heated at the third heating rate ranging from 1.12° C./min to 1.18° C./min to the third temperature ranging from 1030° C. to 1070° C. so as to form the pitch-modified soft carbon into a fourth soft carbon. In Example 4 for the fourth embodiment for obtaining the fourth soft carbon, steps a) to c) are the same as those described in Example 1, step d) involves the portion of the powder being heated to 1050° C., and step e) involves the pitch-contained carbonaceous powder being heated at the third heating rate of 1.16° C./min and kept at the third temperature of 1050° C.

The process parameters for forming soft carbons of Examples 1 to 4 are further shown below in Table 1.

TABLE 1

| | Example | | 1 | 2 | 3 | 4 |
|---|---|---|---|---|---|---|
| | Steps | | First soft carbon | Second soft carbon | Third soft carbon | Fourth soft carbon |
| A | Forming of the green cake | Temperature (° C.) | 500 | 500 | 500 | 500 |
| | | Pressure (MPa) | 1.0 | 1.0 | 1.0 | 1.0 |
| | | Duration (Hour) | 4 | 4 | 4 | 4 |
| B | Preliminary carbonization treatment | Rate (° C./min) | 5 | 5 | 5 | 5 |
| | | Temperature (° C.) | 900 | 900 | 900 | 900 |
| | | Duration (Hour) | 4 | 4 | 4 | 4 |
| C | Powdering and sizing process (μm) | D10 | 6~8 | 3~5 | 6~8 | 6~8 |
| | | D50 | 10~12 | 8~10 | 10~12 | 10~12 |
| | | D90 | 18~20 | 16~18 | 18~20 | 18~20 |
| D | Main carbonization treatment | Rate (° C./min) | 10 | 10 | 10 | 10 |
| | | Temperature (° C.) | 1100 | 1100 | 1200 | 1050 |
| | | Duration (Hour) | 4 | 4 | 4 | 4 |
| E | Surface modifying carbonization treatment | Rate (° C./min) | 1.22 | 1.22 | 0.95 | 1.16 |
| | | Temperature (° C.) | 1100 | 1100 | 1200 | 1050 |
| | | Duration (Hour) | 5 | 5 | 5 | 5 |

Figure 1:
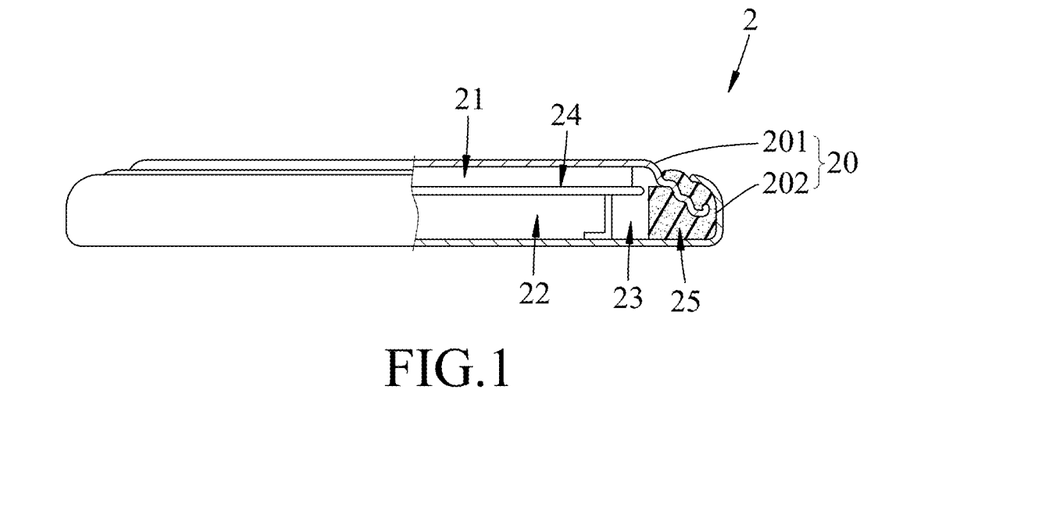
FIG. 1 is a sectional perspective view illustrating an embodiment of a lithium-ion rechargeable battery according to the disclosure.

Referring to FIG. 1, a fifth embodiment of a lithium-ion rechargeable battery 2 is shown to include an outer casing 20, an anode 21 disposed inside the outer casing 20 and including the carbon material (i.e., the first soft carbon made by the first embodiment method), a cathode 22 disposed inside the outer casing 20 and spaced apart from the anode 21, an electrolyte 23 filled inside the outer casing 20, and a separator 24 disposed inside the outer casing 20 and disposed between the anode 21 and the cathode 22. More specifically, the outer casing 20 is composed of an anode casing 201 at an upper side of the lithium-ion rechargeable battery 2 and a cathode casing 202 at a lower side of the lithium-ion rechargeable battery 2. A sealing ring 25 is used to seal a space inside the outer casing 20 between the anode casing 201 and the cathode casing 202. The fifth embodiment of the disclosure is now be explained in more details hereinbelow by way of Example 5.

Example 5

Preparation of Anode

First, the first soft carbon of Example 1 was granulated using a wide inlet granulator, followed by sieving with a sieve screen having a screen size of 38 μm to obtain an anode material. Then, 9.1 g of the anode material, 0.5 g of polyvinylidene difluoride (Manufacturer: Kureha Corporation; Model: KF9200), 0.4 g of a conductive carbon black (purchased from Timcal Ltd; Model: Super P), and 12 g to 15 g of n-methyl-2-pyrrolidone (purchased from Merck Millipore, hereinafter abbreviated as NMP) were evenly mixed to form a mixture. Afterwards, the mixture was spread on a copper foil having a thickness of 14 μm, followed by drying at 85° C. for 0.5 hours to remove water and NMP, so as to form a conductive layer having a thickness ranging from 20 μm to 22 μm on the copper foil, thereby obtaining the anode of Example 5. The conductive layer includes 91 wt % of the anode material, 5 wt % of polyvinylidene difluoride, and 4 wt % of the conductive carbon black based on a total weight of the conductive layer.

Preparation of CR2032 Coin Cell Battery

The CR2032 coin cell battery of Example 5 is made by assembling the anode of Example 5, a lithium foil serving as a cathode, an electrolytic solution, and a separation film made from polyethylene and polypropylene (purchased from Celgard). The electrolytic solution includes 99 wt % of a 1 M lithium hexafluorophosphate (hereinafter abbreviated as $LiPF_6$) solution, and 1 wt % of vinylene carbonate based on a total weight of the electrolytic solution. The $LiPF_6$ solution includes $LiPF_6$, ethylene carbonate (hereinafter abbreviated as EC), ethylene methyl carbonate (hereinafter abbreviated as EMC) and dimethyl carbonate (hereinafter abbreviated as DMC), and a volume ratio of EC:EMC:DMC is 1:1:1.

Preparation of 18650 Battery

The 18650 battery of Example 5 is made by assembling the anode of Example 5, a cathode, and the same electrolytic solution, and the separation film used in the CR2032 coin cell battery using a winding machine. The cathode includes an aluminum foil serving as a conductive carrier, and a conductive film formed on a surface of the aluminum foil. The conductive film includes 91 wt % of a cathode composition, 5 wt % of an adhesive (polyvinylidene difluoride), and 4 wt % of conductive carbon black (purchased from Timcal Ltd; Model: Super P). The cathode composition includes lithium manganese oxide ($LiMn_2O_4$) and lithium nickel manganese cobalt oxide ($LiNi_{1/3}Mn_{1/3}Co_{1/3}O_2$, hereinafter abbreviated as LNMC) in a weight ratio of 30:70.

Figure 2:
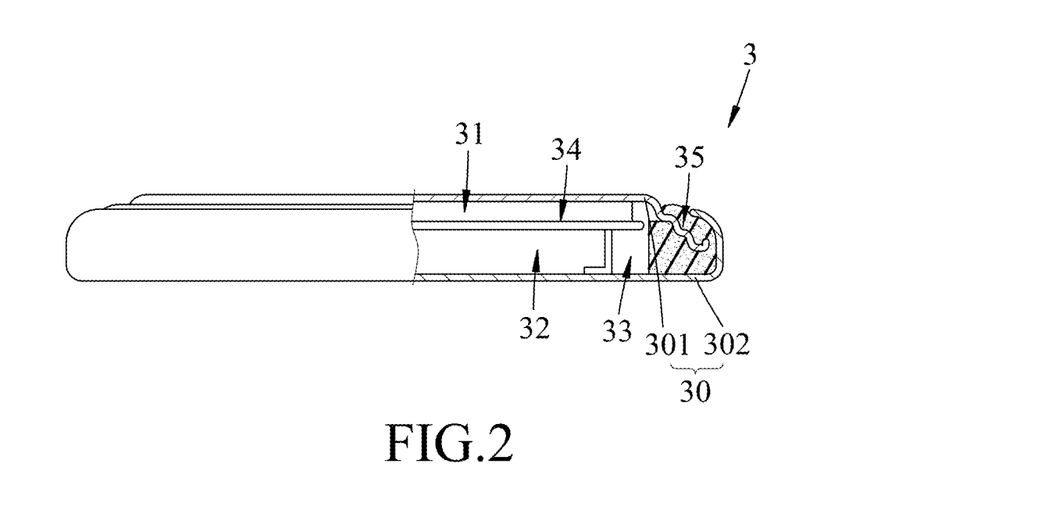
FIG. 2 is a sectional perspective view illustrating another embodiment of the lithium-ion rechargeable battery according to the disclosure.

Referring to FIG. 2, a sixth embodiment of the lithium-ion rechargeable battery 3 is shown to include an outer casing 30, an anode 31 disposed inside the outer casing 30 and including the carbon material (i.e., one of the second, third and fourth soft carbons made by a corresponding one of the second, third and fourth embodiment methods), a cathode 32 disposed inside the outer casing 30 and spaced apart from the anode 31, an electrolyte 33 filled inside the outer casing 30, and a separator 34 disposed inside the outer casing 30 and disposed between the anode 31 and the cathode 32. The outer casing 30 of the sixth embodiment is similar to the outer casing 20 of the fifth embodiment of the lithium-ion rechargeable battery 2. More specifically, the outer casing 30 is composed of an anode casing 301 at an upper side of the lithium-ion rechargeable battery 3 and a cathode casing 302 at a lower side of the lithium-ion rechargeable battery 3. A sealing ring 35 is used to seal a space inside the outer casing 30 between the anode casing 301 and the cathode casing 302. The sixth embodiment of the disclosure will now be explained in more details herein below by way of the following examples. However, it should be understood that the following examples are solely intended for the purpose of illustration and should not be construed as limiting the disclosure in practice.

Example 6

Preparation of CR2032 Coin Cell Battery

The CR2032 coin cell battery of Example 6 was assembled in a way similar to that of Example 5, except that in Example 6, the first soft carbon used for preparing the anode material in the conductive layer was replaced by the second soft carbon of Example 2.

Preparation of 7799130 Battery

The 7799130 battery of Example 6 was made by assembling an anode, a cathode, an electrolytic solution, and a separation film made from polypropylene with a thickness of 20 μm (purchased from Celgard). Specifically, the second soft carbon of Example 2 was granulated using a wide inlet granulator, followed by sieving with a sieve screen to obtain an anode material. Then, 467.5 g of the anode material, 45 g of polyvinylidene difluoride (Manufacturer: Kureha Corporation; Model: KF9200), 20 g of a conductive carbon black (purchased from Timcal Ltd; Model: Super P), 467.5 g of mesophase graphite powder (purchased from China Steel Chemical Corporation, Model: MGP), and 1233 g to 1438 g of NMP were evenly mixed to form a mixture. Afterwards, the mixture was spread on a copper foil having a thickness of 14 μm, followed by drying at 85° C. for 0.5 hours to remove water and NMP, so as to form an anode of the 779130 battery. The 779130 battery has a conductive layer having a thickness ranging from 100 μm to 110 μm on the copper foil. The conductive layer includes 93.5 wt % of an anode composition (including 50 wt % of the anode material and 50 wt % of MGP), 4.5 wt % of polyvinylidene difluoride, and 2 wt % of the conductive carbon black based on a total weight of the conductive layer. The cathode includes an aluminum foil serving as a conductive carrier, and a conductive film formed on a surface of the aluminum foil. The conductive film includes 92.5 wt % of LNMC, 2.5 wt % of an adhesive (polyvinylidene difluoride), and 5 wt % of conductive carbon black (purchased from Timcal Ltd; Model: Super P). The electrolytic solution includes 99 wt % of a 1 M $LiPF_6$ solution, and 1 wt % of vinylene carbonate based on a total weight of the electrolytic solution. The $LiPF_6$ solution includes $LiPF_6$, EC, EMC and diethyl carbonate (hereinafter abbreviated as DEC), and a volume ratio of EC:EMC:DEC is 1:1:1.

Example 7

Preparation of CR2032 Coin Cell Battery

The CR2032 coin cell battery of Example 7 was assembled in a way similar to that of Example 5, except that in Example 7, the first soft carbon used for preparing the anode material in the conductive layer was replaced by the third soft carbon of Example 3.

Preparation of 18650 Battery

The 18650 battery of Example 7 was assembled in a way similar to that of Example 5, except that the first soft carbon used for preparing the anode material in the conductive layer was replaced by the third soft carbon of Example 3.

Example 8

Preparation of CR2032 Coin Cell Battery

The CR2032 coin cell battery of Example 8 was assembled in a way similar to that of Example 5, except that in Example 8, the first soft carbon used for preparing the anode material in the conductive layer was replaced by the fourth soft carbon of Example 4.

Preparation of 18650 Battery

The 18650 battery of Example 8 was assembled in a way similar to that of Example 5, except that in Example 8, the first soft carbon used for preparing the anode material in the conductive layer was replaced by the fourth soft carbon of Example 4.

Testing of Coin Cell Batteries

The first cycle charge capacity and first cycle discharge capacity of each of the CR2032 coin cell batteries were measured using a battery test equipment (Manufacturer: Arbin Instruments; Model: BT2043) under the following test conditions: a testing temperature of 25° C., a C-rate (i.e. a rate at which a battery is charged or discharged) of 0.2 C, an end-of-charge voltage of 0 V and an end-of-discharge voltage of 1.8 V. The percentage of first cycle irreversible capacity loss of each of the CR2032 coin cell batteries was then calculated using the following equation:

$$A=[(B-C)/B]\times 100$$

where A=the percentage of first cycle irreversible capacity loss (%)

B=the first cycle charge capacity

C=the first cycle discharge capacity (B−C)=the first cycle irreversible capacity loss.

Testing of Batteries

The charging and discharging abilities of the 18650 battery of Example 5 and the 7799130 battery of Example 6 were measured using the battery test equipment (Manufacturer: Maccor; Model: Series 4000) at a testing temperature of 25° C., and were represented by a capacity retention rate (%) at a charge C-rate of 0.2 C, 0.5 C, 1 C, 3 C and 5 C for one cycle, and by a capacity retention rate (%) at a discharge C-rate of 0.1 C, 0.5 C, 3 C, 5 C, 8 C and 10 C for one cycle.

Cycle Life Under Room Temperature and High Temperature

The cycle life of each of the 18650 batteries at a C-rate of 2 C was determined using the battery test equipment (Manufacturer: Maccor; Model: Series 4000) at a testing temperature of 25° C. and 45° C. The cycle life under room temperature or high temperature of each of the 18650 batteries is represented by a number of cycles at which the capacity retention rate of the battery is reduced to 82% or 90%.

Figure 3:
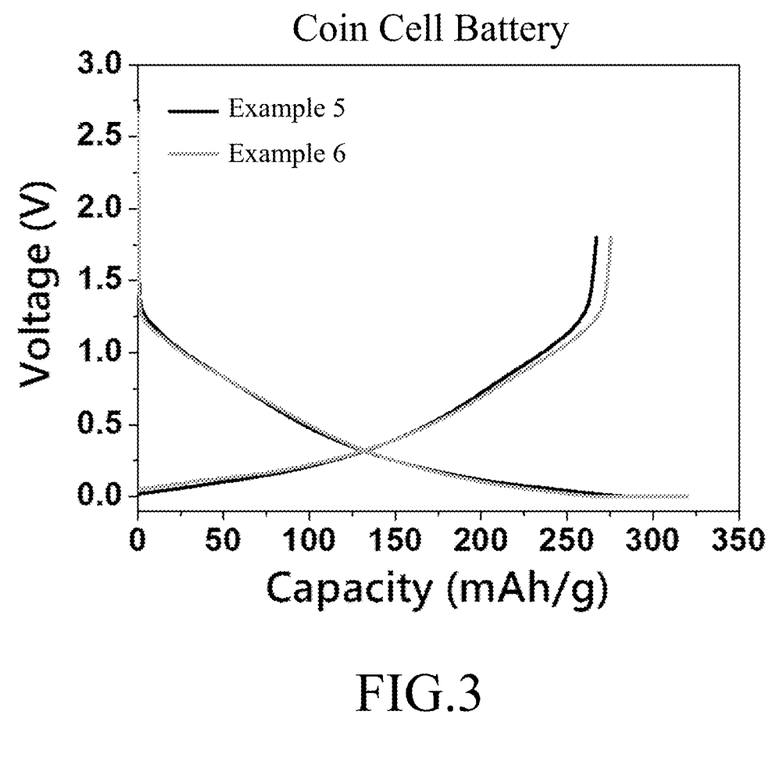
FIG. 3 is a graph illustrating charging and discharging curves of each of coin cell batteries of Examples 5 and 6.

FIG. 3 illustrates charging and discharging curves of each of the coin cell batteries of Examples 5 and 6 when being charged and discharged at a C-rate of 0.2 C. Table 2 below summarizes evaluated properties of each of the coin cell batteries of Examples 5 and 6 in terms of their charging-discharging abilities of the first cycle.

TABLE 2

| Coin cell battery | Example 5 | Example 6 |
| --- | --- | --- |
| First cycle charge capacity (mAg/h) | 312 | 320 |
| First cycle discharge capacity (mAg/h) | 268 | 276 |
| First cycle irreversible capacity (mAg/h) | 44 | 44 |

As shown in Table 2 and FIG. 3, at a C-rate of 0.2 C, the percentage of first cycle irreversible capacity loss of the coin cell battery of Example 6 (including the second soft carbon of Example 2) was calculated to be 13.75% (i.e., [(320−276)/320×100%]), the percentage of first cycle irreversible capacity loss of the coin cell battery of Example 5 (including the first soft carbon of Example 1) was calculated to be 14.10% (i.e., [(312−268)/312×100%]). Therefore, the percentage of first cycle irreversible capacity loss of the coin cell battery of Example 5 (including the first soft carbon of Example 1) was similar to that of Example 6 (including the second soft carbon of Example 2). In addition, the discharge capacity of the coin cell battery of Example 6 (including the second soft carbon of Example 2) was calculated to be approximately 3% (i.e., [(276−268)/268×100%]=2.98%) greater than that of the coin cell battery of Example 5 (including the first soft carbon).

Figure 4:
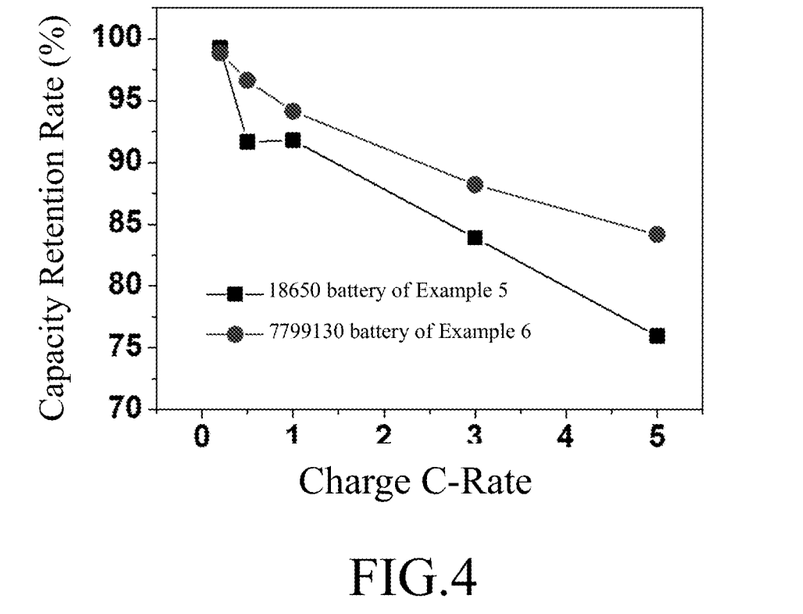
FIG. 4 is a curve graph illustrating a relationship between a charge C-rate and a capacity retention rate of each of a 18650 battery of Example 5 and a 7799130 battery of Example 6.

FIG. 4 illustrates a relationship between a charge C-rate and a capacity retention rate of each of the 18650 battery of Example 5 (including the first soft carbon of Example 1) and the 7799130 battery of Example 6 (including the second soft carbon of Example 2). At a charge C-rate of 3 C, the capacity retention rate of the 7799130 battery of Example 6 was calculated to be at least 5% (i.e., [(88−83.5)/83.5×100%]=5.39%) greater than that of the 18650 battery of Example 5. In addition, at a charge C-rate of 5 C, the capacity retention rate of the 7799130 battery of Example 6 was calculated to be at least 10% (i.e., [(84−76)/76×100%]=10.53%) greater than that of the 18650 battery of Example 5.

Figure 5:
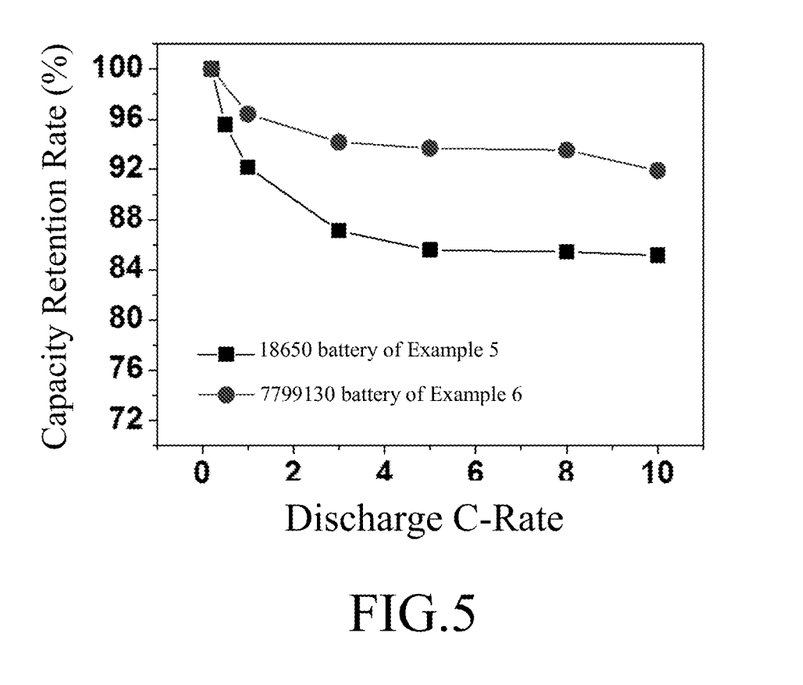
FIG. 5 is a curve graph illustrating a relationship between a discharge C-rate and a capacity retention rate of each of the 18650 battery of Example 5 and the 7799130 battery of Example 6.

FIG. 5 illustrates the relationship between a discharge C-rate and a capacity retention rate between each of the 18650 battery of Example 5 (including the first soft carbon of Example 1) and the 7799130 battery of Example 6 (including the second soft carbon of Example 2). At a discharge C-rate of 3 C, 5 C, 8 C, and 10 C, the capacity retention rates of the 7799130 battery of Example 6 were 8.05%, 9.35%, 9.35%, and 8.24% greater than those of the 18650 battery of Example 5, respectively (i.e., [(94−87)/87×100%=8.05%], [(93.6−85.6)/85.6×100%=9.35%], [(93.6−85.6)/85.6×100%=9.35%] and [(92−85)/85×100%=8.24%]). Therefore, at a discharge C-rate ranging from 3 C to 10 C, the capacity retention rate of the 7799130 battery of Example 6 was at least 8% greater than that of the 18650 battery of Example 5.

Compared to Example 1 for the first embodiment, in step c) of Example 2 for the second embodiment, the D50 particle size was modified from a range between 10 μm to 12 μm to a range between 8 μm to 10 μm, the D10 particle size was modified from a range between 6 μm to 8 μm to a range between 3 μm to 5 μm, and the D90 particle size was modified from a range between 18 μm to 20 μm to a range between 16 μm to 18 μm, so that a specific surface area of the portion of the powder collected in step c) may be increased. As a result, in step e) of Example 2 for the second embodiment, an amount of pitch (i.e. pitch that has reached a softening point and a decreased viscosity), capable of being added to the carbonaceous powder obtained in step d), may be increased, and meanwhile may further reduce a specific surface area of the second soft carbon obtained in Example 2 (i.e., the second soft carbon made by the second embodiment method). The abovementioned adjustment (i.e., adjustment of particle size distribution) may facilitate formation of a stable solid electrolyte interface (SEI) film after activation of the lithium-ion rechargeable battery is completed. From the results shown in FIGS. 4 and 5, it can be found that the formation of the SEI film may increase the capacity retention rate of the lithium-ion rechargeable battery of the sixth embodiment (i.e., the 7799130 battery of Example 6) during fast charging and fast discharging, thereby increasing the fast charging and fast discharging abilities of the lithium-ion rechargeable battery.

Figure 6:
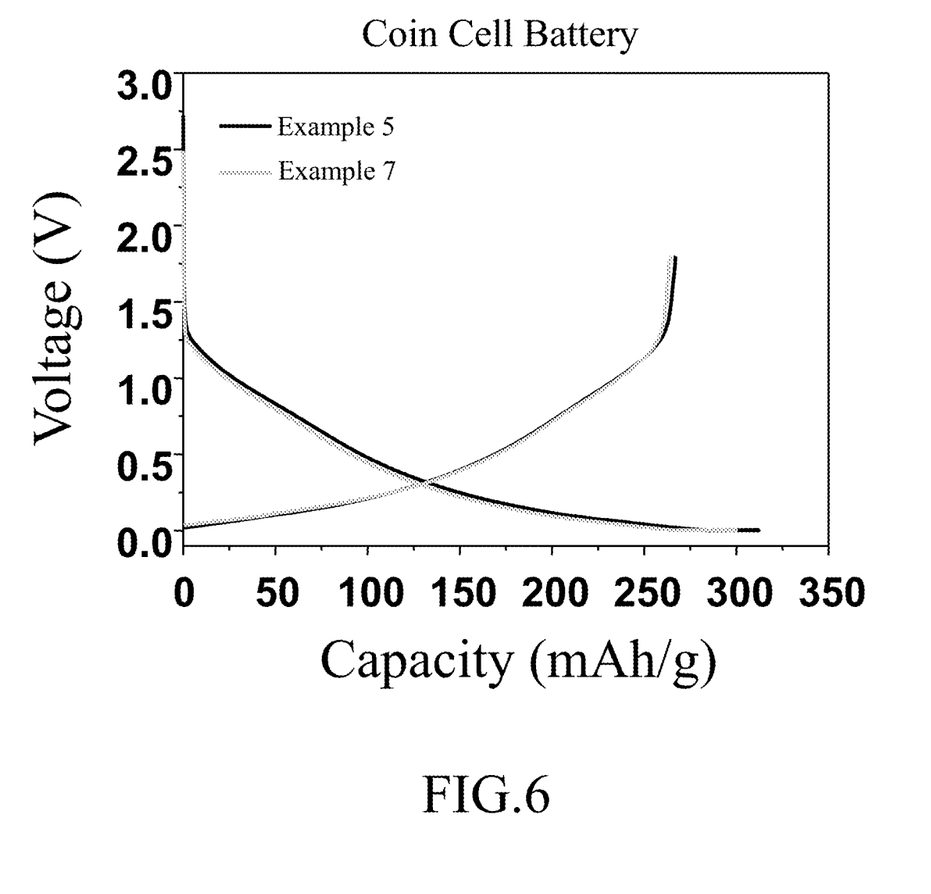
FIG. 6 is a graph illustrating charging and discharging curves of each of coin cell batteries of Examples 5 and 7.

FIG. 6 illustrates charging and discharging curves of each of the coin cell batteries of Examples 5 and 7 when being charged and discharged at a C-rate of 0.2 C. Table 3 below summarizes evaluated properties of each of the coin cell batteries of Examples 5 and 7 in terms of their charging-discharging abilities of the first cycle.

TABLE 3

| Coin cell battery | Example 5 | Example 7 |
| --- | --- | --- |
| First cycle charge capacity (mAg/h) | 312 | 301 |
| First cycle discharge capacity (mAg/h) | 268 | 264 |
| First cycle irreversible capacity (mAg/h) | 44 | 37 |

As shown in Table 3 and FIG. 6, at a C-rate of 0.2 C, the first cycle irreversible capacity loss of the coin cell battery of Example 7 (including the third soft carbon of Example 3) was calculated to be 15.9% (i.e., [(44−37)/44×100%]) lower than that of the coin cell battery of Example 5 (including the first soft carbon of Example 1).

Figure 7:
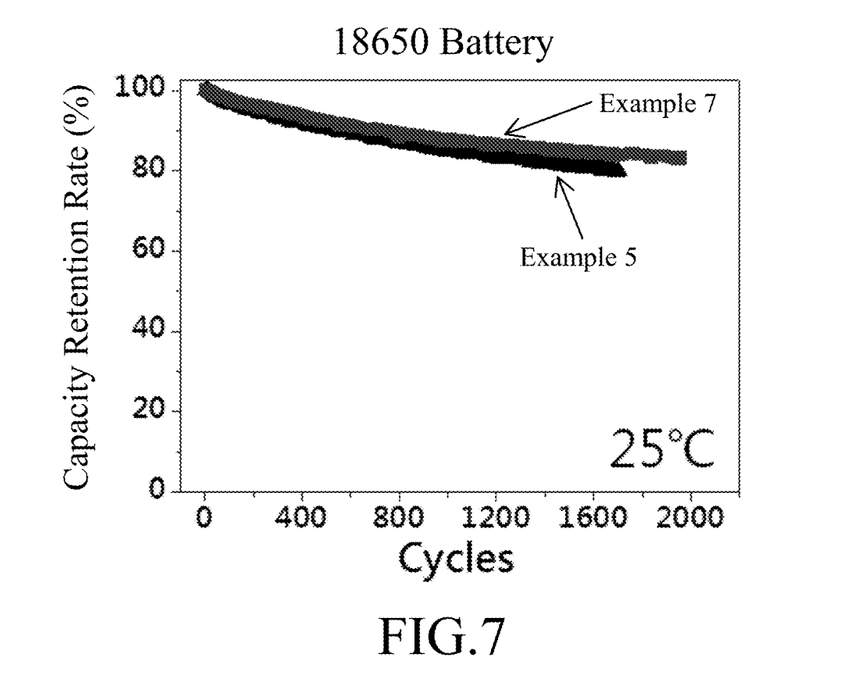
FIG. 7 is a curve graph illustrating a relationship between number of cycles and a capacity retention rate of each of 18650 batteries of Examples 5 and 7 at a testing temperature of 25° C.

FIG. 7 illustrates the relationship between cycles and a capacity retention rate of each of the 18650 battery of Example 5 (including the first soft carbon of Example 1) and the 18650 battery of Example 7 (including the third soft carbon of Example 3) at a testing temperature of 25° C. The cycle life under the testing temperature (25° C.) of each of the 18650 batteries of Examples 5 and 7 is represented by a number of cycles at which the capacity retention rate of the battery is reduced to 82%. Referring to FIG. 7, under a test condition where a charge C-rate was 2 C, a discharge C-rate was 2 C, a testing temperature was 25° C., and a voltage ranged from 4.2 V to 2.4 V, the cycle life of the 18650 battery of Example 7 (including the third soft carbon of Example 3) was approximately 2000 cycles, which was greater than the cycle life (approximately 1700 cycles) of the 18650 battery of Example 5 (including first soft carbon of Example 1).

Figure 8:
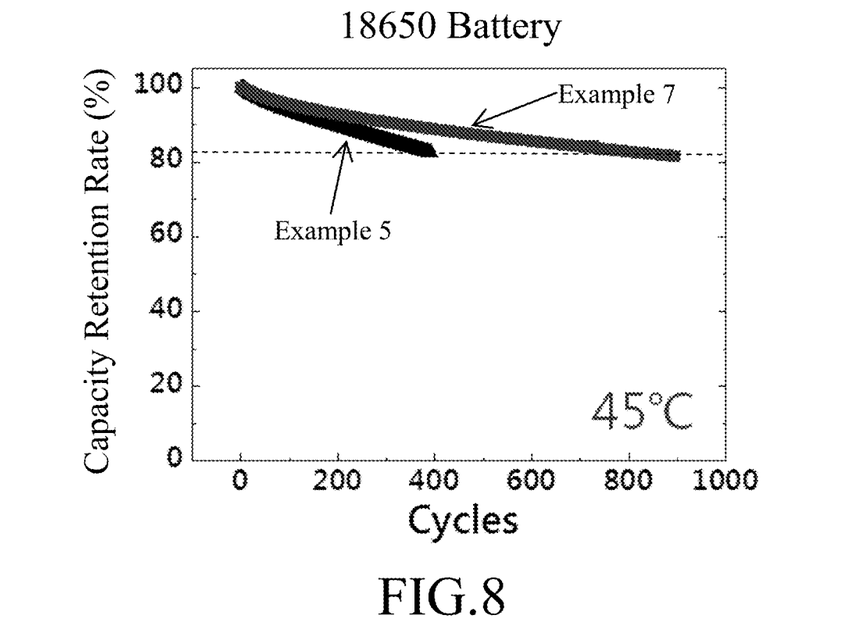
FIG. 8 is a curve graph illustrating a relationship between number of cycles and a capacity retention rate of each of the 18650 batteries of Examples 5 and 7 at a testing temperature of 45° C.

FIG. 8 illustrates the relationship between cycles and a capacity retention rate of each of the 18650 battery of Example 5 (including the first soft carbon of Example 1) and the 18650 battery of Example 7 (including the third soft carbon of Example 3) at a testing temperature of 45° C. The cycle life under the testing temperature (45° C.) of each of the 18650 batteries of Examples 5 and 7 is represented by a number of cycles at which the capacity retention rate of the battery is reduced to 82%. Under a test condition where a charge C-rate was 2 C, a discharge C-rate was 2 C, a testing temperature was 45° C., and a voltage ranged from 4.2 V to 2.4 V, the cycle life of the 18650 battery of Example 7 (including the third soft carbon of Example 3) was greater than that of the 18650 battery of Example 5 (including the first soft carbon of Example 1) by at least 225% (i.e., (900−400)=2.25).

Compared to Example 1 for the first embodiment, in step e) of Example 3 for the third embodiment, the third heating rate was decreased from 1.22° C./min used in Example 1 to 0.95° C./min, and the third temperature was increased from 1100° C. used in Example 1 to 1200° C. Such adjustment of the third heating rate and the third temperature may facilitate the pitch to form a more stable carbon-structure covering on the carbonaceous powder, and may facilitate formation of a more stable SEI film in the lithium-ion rechargeable battery of the sixth embodiment (i.e., the 18650 battery of Example 7) after activation of the lithium-ion secondary battery is completed. From the results shown in FIGS. 7 and 8, it can be found that the SEI film of the 18650 battery of Example 7 is less likely to be damaged or regrow to have an increased thickness (which may lead to an increase in internal resistance and decrease the capacity retention rate and cycle life of the lithium-ion rechargeable battery) during the high temperature. Therefore, the abovementioned adjustment may enhance the cycle life of the lithium-ion rechargeable battery of the sixth embodiment (i.e., the 18650 battery of Example 7) during fast charging and fast discharging.

Figure 9:
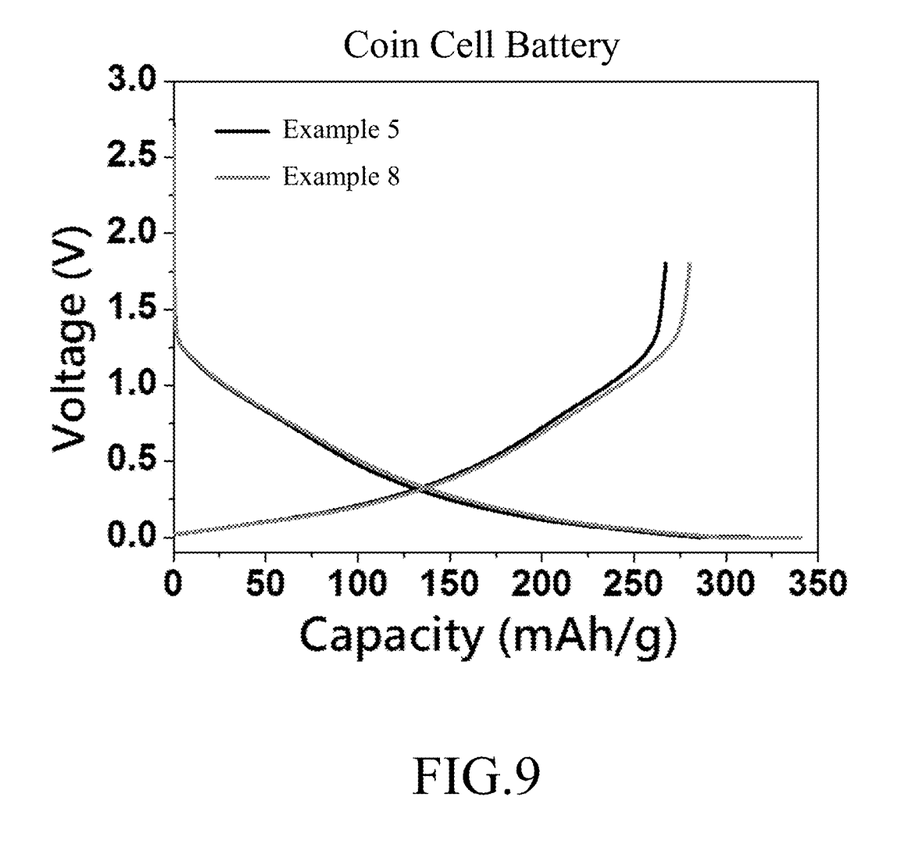
FIG. 9 is a graph illustrating charging and discharging curves of each of coin cell batteries of Examples 5 and 8.

FIG. 9 illustrates charging and discharging curves of each of the coin cell battery of Example 5 (including the first soft carbon of Example 1) and the coin cell battery of Example 8 (including the fourth soft carbon of Example 4) when being charged and discharged at a C-rate of 0.2 C. Table 4 below summarizes evaluated properties of each of the coin cell batteries of Examples 5 and 8 in terms of their charging-discharging abilities of the first cycle.

TABLE 4

| Coin cell battery | Example 5 | Example 8 |
|---|---|---|
| First cycle charge capacity (mAg/h) | 312 | 341 |
| First cycle discharge capacity (mAg/h) | 268 | 288 |
| First cycle irreversible capacity (mAg/h) | 44 | 53 |

As shown in Table 4 and FIG. 9, at a C-rate of 0.2 C, the percentage of first cycle irreversible capacity loss of the coin cell battery of Example 8 (including the fourth soft carbon of Example 4) was calculated to be 15.54% (i.e., [(341−288)/341×100%]), whereas the percentage of first cycle irreversible capacity loss of the coin cell battery of Example 5 (including the first soft carbon of Example 1) was 14.10%. Therefore, the percentage of first cycle irreversible capacity loss of the coin cell battery of Example 5 was similar to that of the coin cell battery of Example 8. In addition, the discharge capacity of the coin cell battery of Example 8 was calculated to be at least 7% (i.e., [(288−268)/268× 100%=7.46%]) greater than that of the coin cell battery of Example 5.

Compared to Example 1 for the first embodiment, in step e) of Example 4 for the fourth embodiment, the third heating rate was decreased slightly from 1.22° C./min used in Example 1 to 1.16° C./min, and the third temperature was decreased slightly from 1100° C. used in Example 1 to 1050° C. Such adjustment of the third heating rate and the third temperature may change the carbon structure of the fourth soft carbon obtained in Example 4 in terms of compactness. That is to say, the fourth soft carbon had $sp^2$ hybridization with a relatively smaller percentage of $sp^3$ hybridization, thus providing an extra space between the $sp^2$ hybridization and $sp^3$ hybridization. After activation of the lithium-ion rechargeable battery of the sixth embodiment (e.g., the coin cell battery of Example 8) is completed, lithium-ions may be reversibly intercalated into the aforementioned extra space of the conductive layer of the anode material, so as to increase the retention capacity of lithium-ions in the lithium-ion rechargeable battery, thereby increasing the discharging ability of the coin cell battery of Example 8 (which can be also observed in FIG. 9).

Figure 10:
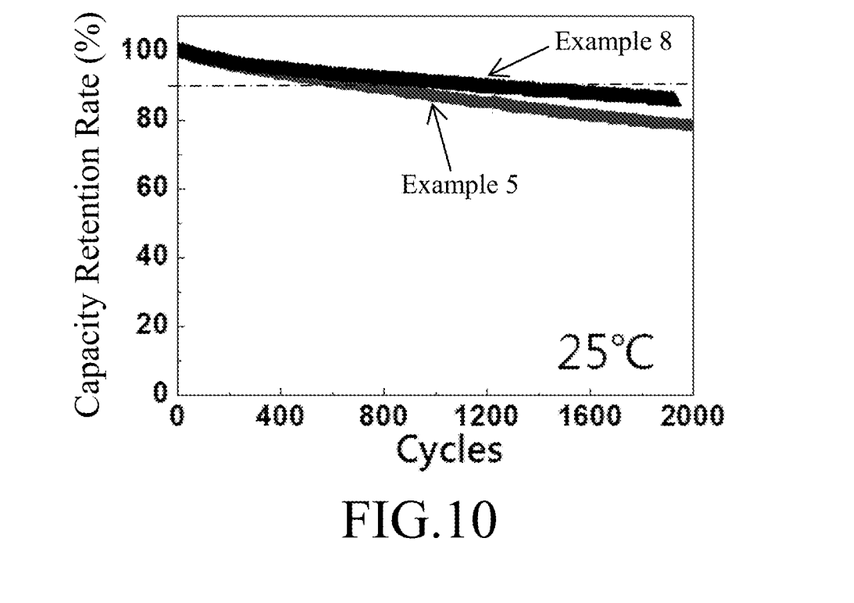
FIG. 10 is a curve graph illustrating a relationship between number of cycles and a capacity retention rate of each of 18650 batteries of Examples 5 and 8 at a testing temperature of 25° C.

FIG. 10 illustrates the relationship between cycles and a capacity retention rate of each of the 18650 battery of Example 5 (including the first soft carbon of Example 1) and the 18650 battery of Example 8 (including the fourth soft carbon of Example 4) at a testing temperature of 25° C. The cycle life under the testing temperature (25° C.) of each of the 18650 batteries of Examples 5 and 8 is represented by a number of cycles at which the capacity retention rate of the battery is reduced to 90%. Referring to FIG. 10, under a test condition where a charge C-rate was 2 C, a discharge C-rate was 2 C, a testing temperature was 25° C., and a voltage ranged from 4.2 V to 2.4 V, the cycle life of the 18650 battery of Example 8 (including the fourth soft carbon of Example 4) was approximately 1250 cycles, which was greater than the cycle life (approximately 700 cycles) of the 18650 battery of Example 5 (including the first soft carbon of Example 1).

Figure 11:
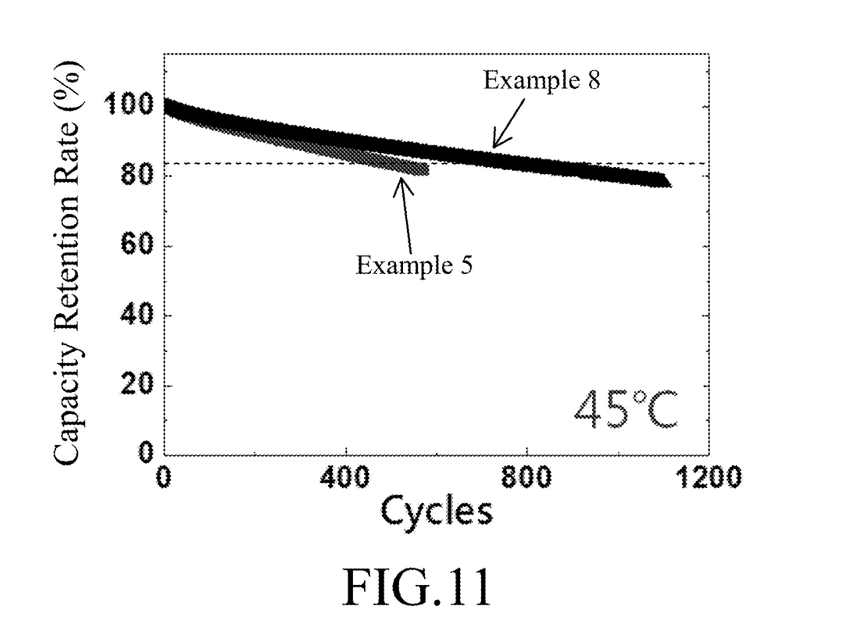
FIG. 11 is a curve graph illustrating a relationship between number of cycles and a capacity retention rate of each of the 18650 batteries of Examples 5 and 8 at a testing temperature of 45° C.

FIG. 11 illustrates the relationship between cycles and a capacity retention rate of each of the 18650 battery of Example 5 (including the first soft carbon of Example 1) and the 18650 battery of Example 8 (including the fourth soft carbon of Example 4) at a testing temperature of 45° C. The cycle life under the testing temperature (45° C.) of each of the 18650 batteries of Examples 5 and 8 is represented by a number of cycles at which the capacity retention rate of the battery is reduced to 82%. Referring to FIG. 11, under a test condition where a charge C-rate was 2 C, a discharge C-rate was 2 C, a testing temperature was 45° C., and a voltage ranged from 4.2 V to 2.4 V, the cycle life of the 18650 battery of Example 8 (including the fourth soft carbon of Example 4) was greater than that of the 18650 battery of Example 5 (including the first soft carbon of Example 1) by at least 150% (i.e., 900/560=1.60).

In summary, in the method for making the carbon material for the anode of the lithium-ion rechargeable battery, by adjusting the D50 particle size and the D10 particle size in the portion of the powder to be collected in step c), and/or by arranging the third heating rate to be ranging from 0.90° C./min to 1.25° C./min and the third temperature to be ranging from 1030° C. to 1220° C. in step e), properties of the pitch-modified soft carbon obtained in step e) may be changed, thereby increasing the fast charging-discharging abilities and cycle life of the lithium-ion rechargeable battery, and thus the purpose of the disclosure is achieved.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for making a carbon material for an anode of a lithium-ion rechargeable battery, comprising a sequence of steps of:
   a) heating a heavy hydrocarbon oil so as to form the heavy hydrocarbon oil into a green coke;
   b) heating the green coke at a first heating rate to a first temperature and keeping the green coke at the first temperature for at least 4 hours so as to form the green coke into a carbon-containing material, the first heating rate ranging from 3° C./min to 5° C./min, the first temperature ranging from 850° C. to 900° C.;
   c) grinding the carbon-containing material into a powder, and sizing the powder to collect a portion of the powder which has a D50 particle size in a range from 8 μm to 12 μm, and a D10 particle size in a range from 1 μm to 8 μm;
   d) heating the portion of the powder at a second heating rate to a second temperature and keeping the portion of the powder at the second temperature for at least 4 hours so as to form the portion of the powder into a carbonaceous powder, the second heating rate ranging from 3° C./min to 10° C./min, the second temperature ranging from 1030° C. to 1220° C.; and
   e) adding pitch to the carbonaceous powder to form a pitch-contained carbonaceous powder, and heating the pitch-contained carbonaceous powder at a third heating rate to a third temperature and keeping the pitch-contained carbonaceous powder at the third temperature for at least 5 hours so as to form the pitch-contained carbonaceous powder into a pitch-modified soft carbon, the third heating rate ranging from 0.90° C./min to 1.25° C./min, the third temperature ranging from 1030° C. to 1220° C.

2. The method as claimed in claim 1, wherein:
   in the portion of the powder obtained in step c), the D50 particle size is in a range from 10 μm to 12 μm, and the D10 particle size is in a range from 6 μm to 8 μm;
   in step d), the second temperature ranges from 1080° C. to 1120° C.; and
   in step e), the pitch includes at least 4 weight parts based on 100 weight parts of the carbonaceous powder, the third heating rate ranges from 1.20° C./min to 1.25° C./min, and the third temperature ranges from 1080° C. to 1120° C. such that the pitch-modified soft carbon is formed as a first soft carbon.

3. The method as claimed in claim 1, wherein:
   in the portion of the powder obtained in step c), the D50 particle size is in a range from 8 μm to 10 μm, and the D10 particle size is in a range from 2 μm to 6 μm;
   in step d), the second temperature ranges from 1080° C. to 1120° C.; and
   in step e), the pitch includes at least 4 weight parts based on 100 weight parts of the carbonaceous powder, the third heating rate ranges from 1.20° C./min to 1.25° C./min, and the third temperature ranges from 1080° C. to 1120° C. such that the pitch-modified soft carbon is formed as a second soft carbon.

4. The method as claimed in claim 1, wherein:
   in the portion of the powder obtained in step c), the D50 particle size is in a range from 10 μm to 12 μm, and the D10 particle size is in a range from 6 μm to 8 μm;
   in step d), the second temperature ranges from 1180° C. to 1220° C.; and
   in step e), the pitch includes at least 4 weight parts based on 100 weight parts of the carbonaceous powder, the third heating rate ranges from 0.92° C./min to 0.98° C./min, and the third temperature ranges from 1180° C. to 1220° C. such that the pitch-modified soft carbon is formed as a third soft carbon.

5. The method as claimed in claim 1, wherein:
   in the portion of the powder obtained in step c), the D50 particle size is in a range from 10 μm to 12 μm, and the D10 particle size is in a range from 6 μm to 8 μm;
   in step d), the second temperature ranges from 1030° C. to 1070° C.; and
   in step e), the pitch includes at least 4 weight parts based on 100 weight parts of the carbonaceous powder, the third heating rate ranges from 1.12° C./min to 1.18° C./min, and the third temperature ranges from 1030° C. to 1070° C. such that the pitch-modified soft carbon is formed as a fourth soft carbon.

* * * * *